Sept. 12, 1961  C. WOLLMERSHAUSER  2,999,631
DUAL AIRFOIL
Filed Sept. 5, 1958  2 Sheets-Sheet 1
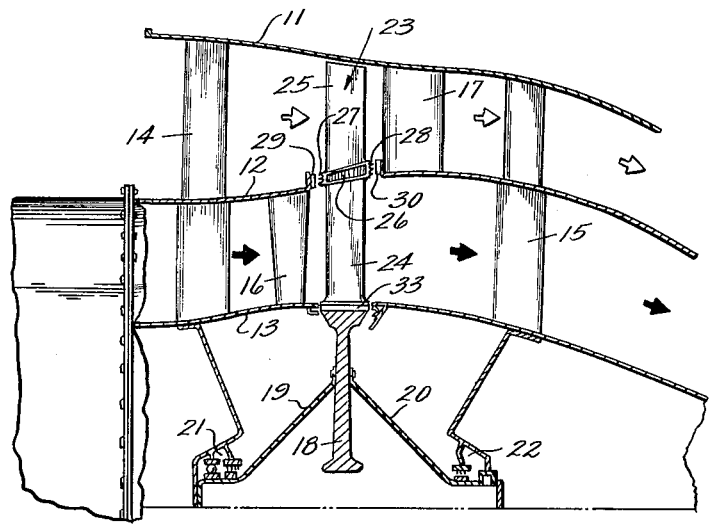
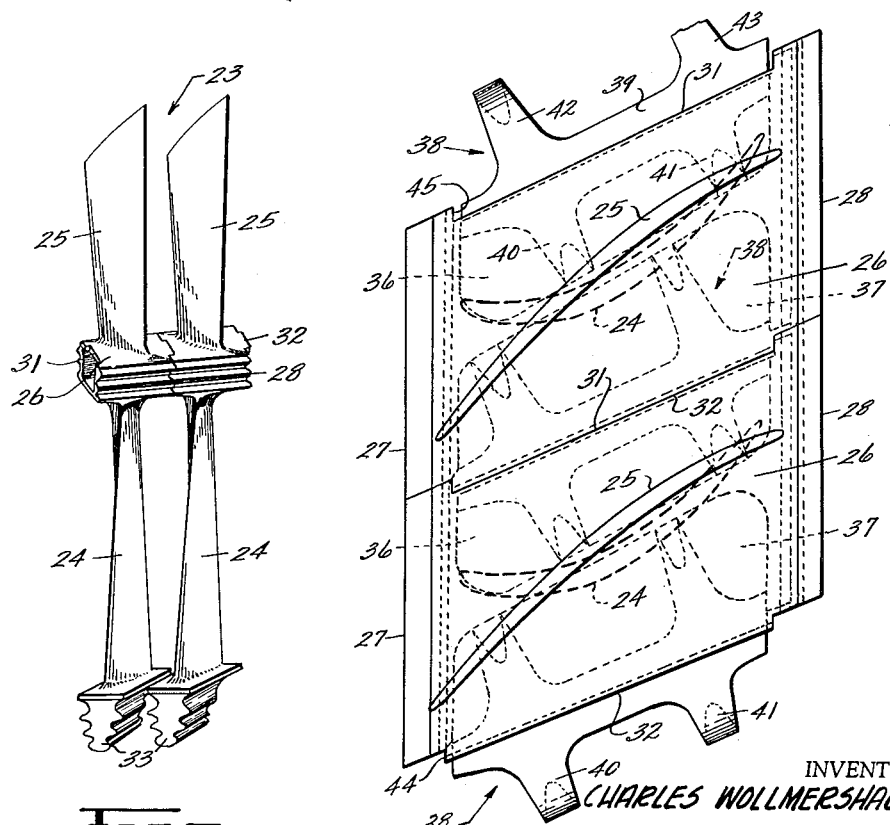
INVENTOR.
CHARLES WOLLMERSHAUSER
BY
Robert B. Crouch
ATTORNEY Sept. 12, 1961     C. WOLLMERSHAUSER     2,999,631
DUAL AIRFOIL
Filed Sept. 5, 1958     2 Sheets-Sheet 2
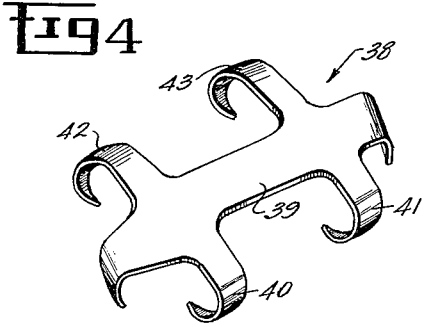
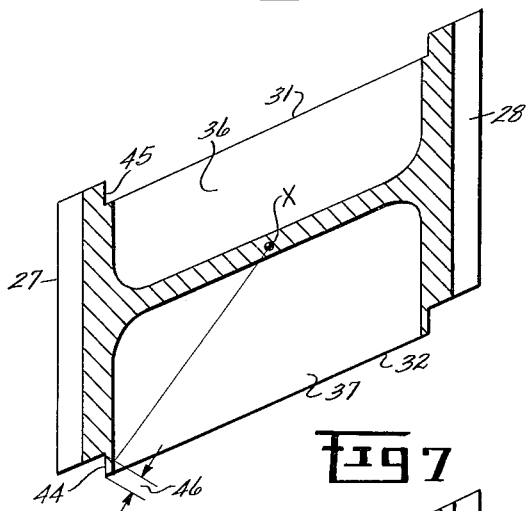
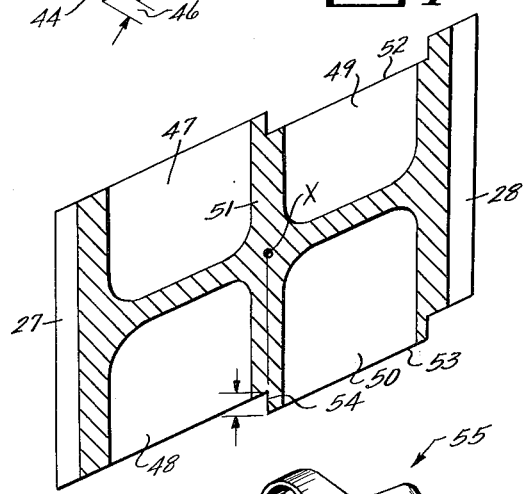
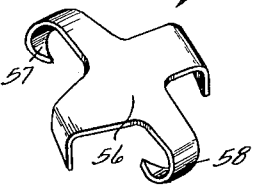
INVENTOR.
CHARLES WOLLMERSHAUSER
BY Robert B. Crowell
ATTORNEY United States Patent Office
2,999,631
Patented Sept. 12, 1961

2,999,631
DUAL AIRFOIL
Charles Wollmershauser, Wyoming, Ohio, assignor to General Electric Company, a corporation of New York
Filed Sept. 5, 1958, Ser. No. 759,251
5 Claims. (Cl. 230—116)

The present invention relates to a dual airfoil for a turbo augmentor and more particularly to such an airfoil having a compressor blade superimposed upon a turbine bucket in axial relation.

In construction of a post-turbine-fan type turbo augmentor for use with an aircraft jet engine, it is necessary to provide a dual airfoil having a turbine bucket adapted to be driven by the exhaust gases of the engine and a compressor blade, mounted as a radial extension of the bucket, to compress a secondary air stream. Since the dual airfoil rotates in two separate gas streams, means must be provided on the airfoils to prevent leakage of gas from one stream into the other. In addition, the dual airfoil is subjected to three different loads: (a) torsion loads resulting from the gas stream flowing against the blade and bucket; (b) centrifugal untwisting loads derived from the fact that the dual airfoil has a constant twist and the effect of centrifugal force is to straighten or untwist the dual airfoil; and (c) flexural and torsional vibrations caused by variations in the gas loads imposed on the blade and bucket by the gas streams. In a practical dual airfoil these loads must be resisted or dampened to prevent displacement of the dual airfoil or failure due to fatigue.

In prior attempts to provide a practical turbo augmentor of the post-turbine-fan type, the dual airfoils have been connected by continuous bands or clamping rings which secure them tightly together. This forms, with a rotor wheel, a rigid rotor construction of sufficient mass to resist the vibrational and torsional stresses occasioned by the gas loads and centrifugal force.

The object of the present invention is to provide a practical dual airfoil of minimum weight which will not be displaced by torsion and centrifugal untwisting loads and is not susceptible to fatigue from flexural and torsional vibrations.

To satisfy the requirements of a practical dual airfoil, applicant provides a turbine bucket axially joined to a compressor blade by means of a mid-platform section, the mid-platform incorporating an interlock to maintain the proper attitude of the bucket and blade and provide highly effective dampening of flexural and torsional vibrations. The mid-platform section also provides a support for sealing means about its entire periphery to minimize inter and intra stage gas leakage.

Other objects and many of the attendant advantages of this invention will be readily appreciated as the same becomes better understood by reference to the following detailed description when considered in connection with the accompanying drawings wherein:

FIG. 1 is an elevation view in section of post-turbine-fan type turbo augmentor embodying the present invention;

FIG. 2 is a perspective view of two dual airfoils according to the present invention;

FIG. 3 is a plan view at an enlarged scale of the dual airfoils of FIG. 2 showing the intra stage sealing;

FIG. 4 is a perspective view of the intra stage sealing strip;

FIG. 5 is an elevation view of a dual airfoil according to the present invention;

FIG. 6 is a sectional view at an enlarged scale of a mid-platform taken alone lines 6—6 of FIG. 5;

FIG. 7 is a sectional view similar to FIG. 6 of a modi-mid-platform; and

FIG. 8 is a perspective view of an intra stage sealing strip for use with the modified mid-platform of FIG. 7.

Referring more particularly to the drawing, FIG. 1 illustrates a post-turbine-fan type turbo augmentor attached to the tailpipe of an aircraft jet engine. As shown, the static structure of the turbo augmentor includes an outer casing or wall 11 which encloses the entire assemblage and provides an inlet for secondary air; an intermediate wall 12 divided into fore and aft sections and separating the secondary air stream from the turbine exhaust; and inner wall 13 formed in two sections which define the inner boundary of the turbine exhaust passage. The three walls are connected by radial struts 14 and 15, and by vanes 16 and 17 which serve as turbine nozzle and outlet guide members, respectively. The rotating structure of the turbo augmentor comprises a single stage rotor which includes a rotor wheel 18 connected to fore and aft stub shafts 19 and 20 supported in bearings 21 and 22, respectively. The bearings are in turn attached to the inner wall sections 13 and are carried by the static structure of the augmentor. A plurality of dual airfoils 23 are mounted on the periphery of the rotor wheel extending radially across both the turbine exhaust passageway defined by walls 12 and 13 and the secondary air passageway defined by walls 11 and 12. Each dual airfoil includes a turbine bucket 24 and a compressor blade 25 joined in axial relation by means of a mid-platform 26. The leading and trailing edges of the mid-platform are serrated to form teeth 27 and 28, respectively, which engage fixed sealing members 29 and 30 carried by the intermediate wall sections to prevent leakage of gases from one passageway into the other.

As shown in FIG. 2, the mid-platform section of each dual airfoil is notched to form a recess 31 in one lateral edge and a projection 32 extending from the opposite lateral edge. When the dual airfoils are assembled on the rotor wheel 18, the mid-platform sections of adjacent dual airfoils abut and the projection 32 of one is received within the recess 31 of the next. For mounting the dual airfoils on the rotor wheel, each dual airfoil is provided with a conventional fir tree base 33 at the root of the turbine bucket 24.

FIG. 3 of the drawing shows in greater detail the engagement between adjacent mid-platform sections and illustrates how front and rear interlocks 34 and 35, respectively, are formed between the contacting surfaces of the mid-platforms at the upstream and downstream faces of the recesses 31 and projections 32. As illustrated in dotted line, the interior of each mid-platform is hollowed out from either lateral edge to define two oppositely extending pockets 36 and 37, each of which opens on one side of the mid-platform. A sealing strip 38 is positioned within the pockets 36 and 37 of adjacent dual airfoils underlying the joint between the projection 32 and recess 31 to seal the space between adjacent mid-platforms.

FIG. 4 shows in detail the construction of the sealing strip 38 which consists of a springy, sheet metal member having an elongated center section 39 and four laterally extending, reversely bent arms 40, 41, 42 and 43, the extremity of each arm being generally parallel with and spaced below the juncture of the arm and center section. The axial extremities of the center section are likewise bent downwardly, but not reversely bent as are the lateral arms. The reversely bent arms 40 and 41 are forced into the pocket 36 of a mid-platform section and are retained in place by means of the spring compression. The remaining portion of the clip 38 is received within a similarly hollowed out pocket 37 of an adjacent dual airfoil.

When in position, the reversely bent laterally extending arms of the clip bear against the upper and lower surfaces of the pockets 36 and 37 and retain the clip firmly in position.

As shown in FIG. 5 the pocket 37 (and the pocket 36) occupies nearly all of the lateral surface of the mid-platform. The width and depth of the pockets 36 and 37 is illustrated in FIG. 6. The forward interlock is located adjacent the leading edge of the mid-platform, since this portion of the mid-platform provides large surface areas on faces 44 and 45 for the bearing load of the large interface forces. Locating the forward interlock in this position permits a maximum saving in weight and results in relative ease and simplicity of manufacture.

Since the dual airfoil of the present invention tends to rotate about its stacking axis $x$, the interface forces will be borne by the projected area of the contacting faces. The projected area 46 of face 44 of the mid-platform of FIG. 6 may not be large enough to accept the interface forces expected in some turbo augmentor designs. Accordingly, a modified mid-platform construction is shown in FIG. 7. In this construction, two pockets 47, 49 and 48, 50 are formed in each lateral surface and are separated by a laterally extending web 51. A recess 52 and a projection 53 are formed on opposite lateral edges of the mid-platform and extend over approximately half of each lateral surface. Since the moment arm of the interface forces lies on web 51 the projected area of face 54 is equal to its actual surface area. Accordingly, greater interface forces can be borne by this construction.

The intra stage seal 55 for the mid-platform construction of FIG. 7 is illustrated in FIG. 8. This seal is essentially half of the seal strip 38 of FIG. 4 and consists of a central member 56 having downturned ends and laterally extending, reversely bent arms 57 and 58. One of these seals is inserted in each of the pockets 48 and 50 and then received within pockets 47 and 49 of an adjacent mid-platform, such that the central members 56 underlie the joints between adjacent pockets.

In the operation of a turbo augmentor of the type illustrated in FIG. 1, the turbine discharge gases are directed against the turbine buckets 24 causing the rotor assembly to rotate. The compressor blades 25, being attached to the tips of the turbine buckets, likewise rotate, compressing the secondary air within the secondary air passageway. This secondary air is then discharged along with the turbine exhaust gases to increase the total mass of air discharged by the engine and consequently increase the overall thrust of the engine. Since, as illustrated in FIG. 2, the compressor blades 25 and turbine buckets 24 are twisted in the same direction, the dual airfoil as a whole tends to rotate in a single direction under the influence of gas load torsion forces and centrifugal untwisting forces. These torsion and untwisting forces are resisted at the mid-platform section by the interlocks which restrain the dual airfoils from untwisting. Since adjacent dual airfoils tend to rotate or untwist in the same direction (clockwise in FIG. 3), the restraint against rotation occurs only at the forward interlock 34. The rear interlock 35 serves only to align adjacent mid-platforms while assembling the rotor.

Relative motion is permitted between adjacent mid-platform sections since the dual airfoils are not clamped together into a rigid structure. The freedom of relative movement between the faces of the interlocks permits the forward interlock 34 to dampen the flexural and torsional vibrations transmitted from the compressor blade and turbine bucket to the mid-platform. To ensure damping, the surface area of the interlock faces must be large enough to distribute the interface loads over a sufficiently large projected area of the faces to prevent freezing or lockup of the interlock.

In addition to the restraint against untwisting and dampening of flexural and torsional vibrations, the forward interlock also maintains the mid-platform in the proper attitude to ensure that the seal teeth 27 and 28 lie parallel to the plane of rotation of the rotor.

Because of the pressure differential existing between the secondary air and the turbine exhaust gas, the exhaust gases will tend to flow outwardly into the secondary air passages where possible. To prevent such leakage, labyrinth seals are provided between the mid-platform sections of the dual airfoils and the intermediate wall sections 12. The teeth 27 on the upstream edge of the mid-platform bear against a fixed sealing surface 29 carried by the forward intermediate wall section 12 and limit the leakage of turbine discharge gases past the leading edge of the mid-platform to a minimum. Similarly, teeth 28 on the trailing edge of the mid-platform bear against a fixed sealing member 30 carried by the rear wall section and perform the same sealing function. Leakage between adjacent dual airfoils is prevented by sealing strips 38 or 55 which underlie and seal the joints between the lateral edges of adjacent mid-platform sections.

The lateral arms of the strips 38 are compressed into the pockets 36 and 37 to maintain the strips in position. Close contact of the strip with the undersurfaces of the interlocked projections 32 and recesses 31 of adjacent mid-platforms is achieved by centrifugal force. This close contact provides a dampening action to resist vibrations of the dual airfoils in the plane of rotation. The magnitude of the dampening force exerted by the strip against the lower surfaces of the projections and recesses increases with the rotational speed of the rotor under the influence of centrifugal force.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What I claim as my invention is:

1. A rotor construction comprising: a rotor wheel; a plurality of dual airfoils mounted on the periphery of the wheel, each dual airfoil including a turbine bucket, a compressor blade, and a mid-platform section connecting the blade to the outer extremity of the bucket, the mid-platforms of adjacent dual airfoils abutting along their lateral surfaces; and interlock faces carried by the mid-platform sections, the interlock faces of adjacent dual airfoils bearing against each other to resist torsion and centrifugal twisting forces, said interlock faces being capable of movement relative to each other; a sealing member adapted to be held adjacent to the mid-platforms to seal the joint therebetween and to provide flexural and torsional vibration dampening.

2. A rotor construction comprising: a rotor wheel; a plurality of dual airfoils mounted on the periphery of the wheel, each dual airfoil including a turbine bucket, a compressor blade, and a mid-platform section, the mid-platform being hollowed out along its lateral surfaces; the mid-platforms of adjacent airfoils abutting along their lateral edges; and a sealing strip received within the hollowed out portions of adjacent mid-platforms to seal the joint between the mid-platforms.

3. A rotor construction as defined in claim 2, in which the sealing strip is capable of being displaced by centrifugal force to bear against the inner surfaces of the hollowed out portion and provide dampening for vibrations in the plane of rotation of the airfoil.

4. A dual airfoil construction comprising: a turbine bucket; a compressor blade; a mid-platform section connecting the blade to an extremity of the bucket as an axial extension thereof; sealing teeth on the upstream and downstream surfaces of the mid-platform forming the toothed portions of labyrinth seals; pockets formed in the lateral surfaces of the mid-platform; and seal strips received within the pockets to seal the spaces along the sides of the mid-platform.

5. A rotor construction comprising: a rotor wheel; a plurality of dual airfoils mounted on the periphery of said wheel, each dual airfoil including a turbine bucket, a compressor blade and a mid-platform section connecting the blade to the bucket, said mid-platform sections each having interlocking faces generally parallel to the longitudinal axis of the dual airfoil which resist torsional and centrifugal twisting loads exerted on the dual airfoils; and a sealing member received between adjacent dual airfoils, said member being positioned adjacent the inner surfaces of said mid-platforms to bear against the mid-platforms and seal the joint therebetween and to provide dampening for vibrations in the plane of rotation of the airfoils.

References Cited in the file of this patent

UNITED STATES PATENTS

| | | |
|---|---|---|
| 1,554,614 | Allen | Sept. 22, 1925 |
| 1,999,711 | Zetterquist | Apr. 30, 1935 |
| 1,999,739 | Rasmussen | Apr. 30, 1935 |
| 2,333,053 | Stroehlen | Oct. 26, 1943 |
| 2,336,323 | Warren | Dec. 7, 1943 |
| 2,391,623 | Heppner | Dec. 25, 1945 |
| 2,398,140 | Heppner | Apr. 9, 1946 |
| 2,405,164 | Pavlecka | Aug. 6, 1946 |
| 2,411,124 | Baumann | Nov. 12, 1946 |
| 2,646,209 | Galliot | July 21, 1953 |
| 2,647,684 | Lombard | Aug. 4, 1953 |
| 2,660,400 | Griffith | Nov. 24, 1953 |
| 2,668,413 | Giliberty | Feb. 9, 1954 |
| 2,772,854 | Anxionnaz | Dec. 4, 1956 |

FOREIGN PATENTS

| | | |
|---|---|---|
| 51,150 | Austria | Dec. 11, 1911 |
| 411,473 | France | June 17, 1910 |
| 586,559 | Great Britain | Mar. 24, 1947 |
| 662,357 | Great Britain | Dec. 5, 1951 |